3,240,722
α-SUBSTITUTED PARA-XYLYLENE POLYMERS AND METHOD FOR THE PREPARATION THEREOF
Frederick W. Orttung, Jr., Middlesex, Rudolph W. Kluiber, Bernardsville, Heinrich G. Gilch, Plainfield, and William L. Wheelwright, Newark, N.J., assignors to Union Carbide Corporation, a corporation of New York
No Drawing. Filed Oct. 22, 1962, Ser. No. 232,240
40 Claims. (Cl. 260—2)

This invention relates to a novel family of polymers and a unique method of polymerization that permits their convenient preparation. More particularly, this invention relates to poly(α-substituted p-xylylenes) and to a method for the preparation thereof.

The interesting combination of high thermal and chemical stability found in the para-xylylene family has heretofore led to the preparation of such polymers by various methods. M. Swarc prepared poly(p-xylylene) by pyrolysis of p-xylene at temperatures between about 800° C. and 1000° C. (Nature, 160, 403 (1947); Discuss. Faraday Soc., 2, 46 (1947); J. Chem. Phys., 16, 128 (1948); and J. Pol Sci., 6, 319 (1951).) The preparation of p-xylylene polymers containing halogen is described by Hall, U.S. 2,914,489, wherein mono- and dihalogenated p-xylenes are pyrolyzed at temperatures between about 570° C. and 765° C. The thermal decomposition of trimethyl(p-methyl-benzyl) ammonium hydroxide to prepare p-xylylene polymers is described by Fawcett, U.S. 2,757,146. Young, U.S. 2,999,820, also found that poly(p-xylylenes) could be produced, upon the elimination of a tertiary amine, by the reaction of quaternary ammonium compounds and aqueous alkali metal hydroxides at temperatures above 100° C.

It can readily be seen that the methods heretofore employed have involved polymerization procedures requiring vigorous reaction conditions, i.e., pyrolsis, thermal decomposition, and other vigorous techniques. Such procedures have limited applicability as industrial methods due to the difficulties which arise in high temperature process control and corrosion problems which are concomitant with the use of most reagents as such temperature levels. Moreover, the polymers resulting from such vigorous processes have been found to be cross-linked to varying extents.

Accordingly, it is an object of the present invention to provide a novel polymerization process requiring comparatively mild reaction conditions in contrast to the rigorous methods heretofore employed.

It is another object to provide truly linear α-substituted-p-xylylene homopolymers and copolymers.

It is still another object to provide novel precursor compounds of the α-substituted-p-xylylene polymers.

These and other objects of the present invention will become more apparent from the ensuing discussion and appended claims.

Now in accordance with the present invention, truly linear α-substituted-p-xylylene polymers having the general structure:

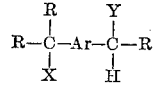

(III)

wherein the moiety designated AR is a divalent aromatic radical, R is a member selected from the group consisting of hydrogen, halogen having an atomic number of at least about 17, phenyl, and alkyl groups, and Y is a substituent having a sigma para value preferably between about zero and about +0.9 can be prepared by the process which comprises admixing an α-halo precursor having the structural formula:

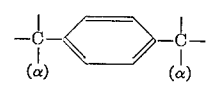

wherein Ar, R, and Y are as defined above and X is a halogen, with a base such as alkali metal cyanides, alkali metal hydroxides, alkali metal alkoxides, quaternary ammonium hydroxide, and the like, said sigma para value and the basicity of said base being commensurate such that dehydrohalogenation and simultaneous polymerization occurs, and thereafter recovering the polymeric product.

The divalent aromatic portion designated Ar is linked through para positions or their stearic equivalents to α-carbon atoms, i.e., carbon atoms adjacent to the divalent aromatic nucleus such as in

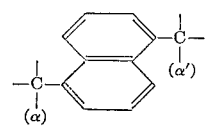

or

The divalent aromatic portion can be substituted or unsubstituted in the available ring positions and is one capable of forming a quinoid system. For example, 1,4-benzene, 1,4- or 2,6-naphthalene, 9,10-anthracene, 9,10-phenanthrene, 4,4′-biphenyl, 4,4″-terphenyl, and like others. Such nuclei possess the inherent ability to undergo rearrangement under appropriate reaction conditions to a quinoid form, e.g.,

or

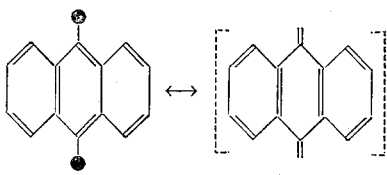

The polymerization process of the present invention appears to be the specific result of a unique 1,6-dehydrohalogenation which would be difficult to predict from normal reactivity considerations. The term "1,6-dehydrohalogenation" as used herein and in the appended claims refers to the elimantion of the elements of hydrogen halide from the alpha and alpha′ carbon atoms of a divalent aromatic nucleus and the resulting simultaneous polymerization. The dehydrohalogenation of an alpha substituted xylene, for example, α-cyano-α′-bromo-p-xylene was taken as characteristic of the class of divalent aromatic nuclei capable of forming "quinoid" structures, therefore, "1,6-" refers to the alpha and alpha′ or 1,6-carbon atoms of a xylene nuclei, i.e.,

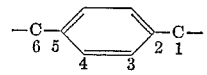

and hereafter refers to the alpha and alpha' carbon atoms of a divalent aromatic nucleus as defined hereinabove.

While not wishing to be bound by any theory or mechanism, it appears that the key step in this unusual polymerization process is the formulation of a spontaneously polymerizable xylylene (II) by the near simultaneous removal of a proton and a halide ion from the alpha and alpha' carbon atoms of the initial α-halo precursor (I) to form the α-substituted polymer (III) below wherein Ar, R, X and Y are as defined hereinbefore:

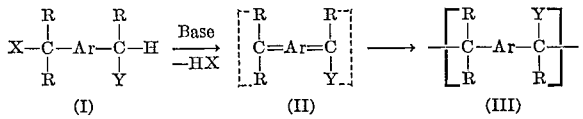

The unique 1,6-dehydrohalogenation appears to be the result of the specific combination or the degree of anionic stabilization afforded by the substituent Y having a sigma para value from about zero to about +0.9 and the degree of basicity of a base, preferably an alkali metal base, said base having a basicity commensurate with the degree of anionic stabilization provided by the Y substituent. For example, at high positive sigma para values, the acidity of the proton on an alpha carbon bearing both the divalent aromatic radical and the Y substituent is greatly enhanced, therefore a comparatively weak base such as NaCN is of sufficient basicity to initiate the dehydrohalogenation and simultaneous polymerization by abstracting the proton on the alpha carbon bearing both the Y substituent and the proton to form the anion; whereas at low sigma para values the acidity of the proton is not as greatly increased, requiring therefore, a stronger alkali metal base such as potassium butoxide to initiate the dehydrohalogenation and simultaneous polymerization. Thus, a "commensurate" base is a base exhibiting sufficient basicity to remove a proton on an alpha carbon bearing both a divalent aromatic substituent and a Y substituent for a given sigma para value of said Y substituent.

As employed herein the term "sigma para value" means the relative electron withdrawing power of substituent groups conventionally known as the Hammett sigma para value as is set forth by Jaffe, in Chemical Reviews, 53, page 222 (1953). In this article the principal aromatic substituent groups are classified as to their electron withdrawing power. Those substituents possessing a negative sigma para value will increase the average electron density on an aromatic nucleus and thus activate the nucleus toward reaction, whereas the groups possessing a positive sigma para value will decrease the average electron density and thus relatively inactivate the nucleus.

Those substituents exhibiting resonance stabilization in addition to the inductive stabilization of the anion can better be represented by a sigma*para value which takes into account both effects and, therefore, gives the substituent a higher positive value. For example, the carboethoxy substituent having a sigma para value of 0.522 has a corresponding sigma*para value of 1.000. For the purposes of this invention, sigma para values are deemed sufficient to give an adequate classification of the applicable substituents and therefore will hereinafter be solely employed. It is believed, however, that in determining a commensurate base for those α-halo precursors bearing a Y that have a sigma*para value, this value would be more accurate for the determinative purpose. It has been found that these substituents when substituted in alpha positions exhibit relatively the same electron withdrawing characteristics as they possess as nucleur substituent groups. It is believed that the use of alpha substituents having a positive sigma para value preferably between about zero and about +0.9 is a key factor which enables the use of such relatively mild conditions to effect the 1,6-dehydrohalogenation.

Those substituent groups which can be employed and which have sigma para values in the range defined include, for example, those of the following list, in which the relative sigma para values are shown:

| Group: | Sigma para value |
| --- | --- |
| H | 0.000 |
| C₆H₅ | +0.009 |
| Cl | +0.227 |
| Br | +0.232 |
| I | +0.276 |
| O—R<br>|<br>—C=O<br>(where R is an alkyl group) | +0.522 |
| —CF₃ | +0.551 |
| —C≡N | +0.628 |
| —SO₂CH₃ | +0.728 |
| —NO₂ | +0.778 |

The above listing is exemplary only, for any similar substituent group having a sigma para value in the range defined can be employed.

Inasmuch as the polymerization via 1,6-dehydrohalogenation involves only the removal of a proton and a halide ion from the alpha and alpha' carbon atoms and the stabilization of the anion formed upon removal of the proton is governed by the substituent, herein designated as Y, it can be readily seen that the remaining alpha substituents function essentially as inert groups. Thus the inert substituents, herein designated as R, can be hydrogen, halogen having an atomic number of at least about 17 or any organic substituent which can normally be substituted in alpha position, such as alkyl, aryl, alkenyl, hydroxyalkyl, and other similar groups.

Particularly preferred of the substituted groups are those simple hydrocarbon groups such as the lower alkyls as methyl, ethyl, propyl, isobutyl, t-butyl, hexyl, lower aryl hydrocarbons such as phenyl, alkylated phenyl, naphthyl, halogens having an atomic number of at least about 17 such as chlorine, bromine iodine, and hydrogen and the like. Most preferably, R is a member selected from the group consisting of hydrogen, halogen having an atomic number of at least about 17, phenyl, and alkyl groups.

A wide range of starting materials have been found applicable to the present invention. Both ring substituted and alpha substituted precursors are suitable within certain limits. Substitution of hydrogen, halogen, hydrocarbons, or combinations thereof in all positions on the alpha carbons, providing there is at least one hydrogen in an alpha position and at least one halogen in an alpha' position, can result in substituted precursors capable of undergoing the novel 1,6-dehydrohalogenation of the present invention. Substituents which cannot themselves undergo dehydrohalogenation or a similar elimination to form styrene derivatives or substituents which are not connected to the α-carbon atoms through hydrogen bearing carbon atoms are preferred. To prevent styrene formation when using alkyl groups having alpha hydrogens, it is considered important to maintain a greater difference in acidity between the alpha and alpha' carbons than exists between the carbon in alpha position and the carbon of the alkyl group bearing an alpha hydrogen. This problem is more likely to occur when the Y substituent has a sigma para or sigma *para value below about 0.5.

It is, of course, within the scope of the present invention to prepare homopolymers having only a single alpha substituent with the remaining alpha positions occupied by hydrogen as well as a homopolymer wherein all the alpha positions are occupied by hydrogen or any combination thereof. Thus it is seen that polymers can be prepared which are substituted in any and/all of the available alpha positions in the polymer chain.

It is not necessary that there be only one monomeric precursor employed in the reaction mixture. When two or more different species having essentially the structure (I) are present, random copolymers of the several species will result. Therefore, polymerization via 1,6-dehydrohalogenation is applicable not only to homopolymerization but also to copolymerization as well. A commensurate base, for copolymerization purposes, is a base whose basicity is commensurate with the lowest sigma para value provided by the different α-halo precursors (I).

Bases which have been found effective in inducing the novel polymerization process of the present invention are alkali metal hydroxides such as lithium hydroxide, sodium hydroxide, potassium hydroxide and the like, alkali metal alkoxides such as sodium methoxide, potassium t-butoxide, and the like, alkali metal cyanides such as sodium cyanide, potassium cyanide, and the like, and quaternary ammonium hydroxides such as ammonium hydroxide and tetramethyl ammonium hydroxide. Both aqueous and alcoholic solutions of such bases are applicable to the present invention. It is considered critical, however, that the strength of the base be commensurate with the degree of acidity or anionic stabilization afforded by the relative electron withdrawing power of the substituent herein designated as Y. At sigma para values between about $+0.5$ and about $+0.9$, comparatively weak bases as defined hereinabove can be employed. For example, the cyano radical having a sigma para value of $+0.628$ exhibits sufficiently strong electron withdrawing characteristics to render the proton highly acidic and thereby allowing the use of a comparatively weak alkali metal cyanide base; whereas, the carboalkoxy radical having a sigma para vlue of $+0.522$ requires a stronger base such as an alkali metal hydroxide to effect the dehydrohalogenation and simultaneous polymerization at a comparable rate due to its weaker electron withdrawing characteristics. At sigma para values between about zero and about $+0.5$, the Y substituent does not produce as great an anionic stabilization as is effected at the higher sigma para values thereby necessitating the use of a strong base such as an alkali metal alkoxide. It has been found that even slightly negative sigma para values can be tolerated by employing such strong bases as the alkali metal alkoxides. For example, a strong base such as potassium t-butoxide can initiate the dehydrohalogenation where the Y substituent has a slightly negative sigma para value of about $-0.2$.

As can be readily seen, the determination of the proper and therefore "commensurate" base is a matter easily ascertained by those skilled in the art.

Although the reaction stoichiometry requires one mole of base per mole of α-halo precursor (I), an excess of base over the required stoichiometric proportions provides better assurance of more complete reaction. The molar ratio of base to α-halo precursor can range from about 0.1:1 to 15:1. More preferably, the reactant ratio of base to α-halo precursor ranges from about 1:1 to 7:1. Although greater or lesser amounts can be employed. At the most concentrated ratios, care must be taken to dissipate the reaction's exotherm.

While not considered critical, it has been found that free-radical producing agents of the type that promote normal vinyl polymerization, increase the polymer yield. Exemplary of those which have been found effective are azo-bis-isobutyronitrile, benzoyl peroxide, peracetic acid, methyl ethyl ketone peroxide, cyclohexanone peroxide, cyclohexyl hydroperoxide, 2,4-dichlorobenzoyl peroxide, cumene hydroperoxide, tert-butyl hydroperoxide, methyl amyl ketone peroxide, dicumyl peroxide, lauryl peroxide, benzoyl peroxide, hydrogen peroxide, tert-butyl perbenzoate, di-tert butyl diperphthalate, and like others.

Although the concentration of free-radical producing agent can range from 0.1% to 10.0% by weight of the α-halo precursor, it has been found that the molecular weight of the polymer as measured viscosimetrically decreased with increasing concentration of free-radical agent. Therefore, it is preferred that the free radical producing agent be present in amounts of from about 0.1% to 5.0% by weight of the α-halo precursor.

Although the presence of oxygen does not completely inhibit the reaction, at otherwise equal conditions, the strict exclusion of air or oxygen from the reaction vessel and reagents can afford about a 10% improvement in yield and a higher molecular weight.

The reaction temperature has been found to be, in large measure, effected by the choice of the Y substituent and the commensurate base. For example, at sigma para values between about zero and $+0.5$, the temperature is not considered at all critical and can range from about $-50°$ C. to about $200°$ C. for a given Y substituent within the above-defined range. The commensurate basicity required decreased as the temperature rises and conversely, the use of stronger bases allow the use of lower temperatures. A sigma para values between about $+0.5$ and about $+0.9$, the temperature can also range from about $-50°$ C. to about $200°$ C. but temperatures of about $-20°$ C. to about $100°$ C. are more preferred with about room temperature being most preferred. It has been found that the reaction can proceed instantaneously at room temperature. While the higher temperatures can be used if desired, lower molecular weight polymer can result.

The polymerization reaction can proceed with or without the presence of a solvent for the α-halo precursor. However, the use of an inert organic phase which is a solvent for the α-halo precursor at reaction conditions has resulted in higher yields and higher molecular weight. It is considered critical however, that the acidity of the solvent be less than the acidity of the conjugate acid of the base employed and furthermore, that the solvent employed undergo no reaction with the α-halo precursor such that would prevent formation of a quinoid intermediate.

Such solvents as alcohols, ethers, nitriles, ketones, aliphatic hydrocarbons, aromatic hydrocarbons, glycols, and the like have been employed. Particularly preferred are such solvents as cyclohexanol, methanol, ethanol, n-butanol, t-butanol, isopropanol, n-hexanol, propionitrile, cyclohexanone, ethylene glycol-dimethyl ether, ethylene glycol, toluene, benzene, decane, p-xylene, decalin, 1-chloronaphthalene, o-dichlorobenzene, naphthalene and suitable mixtures thereof.

Preferably, the normal boiling points of these solvents are between about $25°$ C. and $175°$ C. so that reflux conditions can be maintained without need for a pressure system although one could easily be employed without departing from the scope of the present invention. Accurate temperature control can be maintained by other methods as are obvious to those skilled in the art.

While the 1,6-dehydrohalogenation reaction generally is conveniently carried out in a solvent, it can also be performed in a melt of an alkali metal base or a mixture of alkali metal bases.

As an alternative polymerization technique, the α-halo precursor can be dissolved in a suitable inert organic solvent such as benzene or any of those solvents hereinabove described and brought into contact with a suitable aqueous base, the polymerization occurring at the aqueous base/organic solution interface.

The α-substituted polymers can also be formed in situ by reacting a suitable starting material with base in such a manner that the base replaces a substituent on an alpha carbon to form the α-halo precursor (I) which upon further contact with the remaining base undergoes the 1,6-dehydrohalogenation to simultaneously form a α-substituted polymer. For example, when α,α'-dichloro-p-xylene is reacted with potassium cyanide, an intermediate of the form of the α-halo precursor, in this case, α-cyano, α'-chloro-p-xylene is formed which when further contacted with the potassium cyanide remaining in the reaction mixture undergoes the 1,6-dehydrohalogenation to form poly(α-cyano-p-xylylene).

Reactions of this type are particularly convenient in the preparation of α-cyano-p-xylylene polymers. The starting materials for in situ polymerization are preferably those which lend themselves readily to cyano substitution such as those represented by the general formula:

$$X-\underset{\underset{R}{|}}{\overset{\overset{R}{|}}{C}}-Ar-\underset{\underset{R}{|}}{\overset{\overset{H}{|}}{C}}-X$$

wherein Ar, R, and X are as defined hereinabove. Contacting the above described starting material with a soluble alkali metal cyanide such as potassium cyanide or sodium cyanide results in the formation of the α-halo precursor (I) and simultaneous 1,6-dehydrohalogenation and polymerization of said precursor due to the presence of the basic cyanide.

It is considered important for in situ polymerization that there be present in the reaction media both water and an organic phase which is itself both a reasonably good solvent for the dihalo precursor at elevated temperatures and at least partially water soluble. There need be only enough water present to provide a near saturation concentration of cyanide (for KCN this is about 35–50% by weight) in the aqueous phase; excesses of water have been found to decrease the yield.

A minimum temperature of about 65° C. to 90° C. is required to effect the first reaction step for in situ polymerization, namely, the replacement of one halogen by nitrile to form the α-halo precursor (I). This appears to be necessary only in order to effect the replacement, for as can be seen in the examples to follow, the base-induced dehydrohalogenation of a halonitrile or more generally the α-halo precursor (I) can proceed almost instantaneously at room temperature or much lower.

It is thus seen that polymerization via 1,6-dehydrohalogenation can be effected by a variety of techniques, all of which take advantage of the specific combination of reactivities which result from the formation of the α-halo precursor (I) and its simultaneous polymerization.

Due to the possibility of hydrogen and halogen appearing on adjacent carbon atoms of the polymeric product, hydrogen halide can be split off by heating or treatment with base to form random unsaturation in the polymer chain. Such unsaturation gives rise to brightly colored polymers quite useful as pigments.

The following examples are merely illustrative of the present invention and are in no way intended to limit the scope thereof. Unless otherwise specified, all percentages and parts are by weight.

The following two examples illustrate the preparation and polymerization of the novel compound, α-cyano-α'-bromo-p-xylene. The polymerization of the α-halo precursor to form poly(α-cyano-p-xylylene) has given strong support to the novel process of polymerization via 1,6-dehydrohalogenation.

*Example I.—Preparation of α-cyano-α'-bromo-p-xylene*

32.4 grams of p-tolyl acetonitrile was mixed with 45.0 grams of N-bromo-succinimide and 10 grams of benzoyl peroxide in 400 ml. of reagent grade carbon tetrachloride. The reaction was mechanically stirred and refluxed at 80° C. for 3 hours, by which time all solids in the vessel floated. The solids were subsequently filtered off and the filtrate was evaporated under vacuum at 50° C. to a constant residue weight of 51 grams. This tan syrup solidified in 24 hours at 0° C. and purification on a porous plate yielded 22 grams of pale tan crystals, melting point 64–66°. Two recrystallizations from heptane gave 14 grams (27%) of alpha-cyano-alpha'-bromo-p-xylene as white platelets, melting point 68°. The infrared spectrum of this compound showed no absorptions at 1,380, 2,850, and 2,950 cm.⁻¹, which indicates the absence of a methyl (—CH₃) group in the product, such as would be shown if there were present any substantial amount of

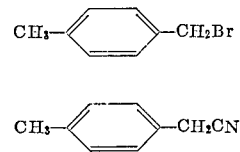

Thus the product was essentially pure α-cyano-α'-bromo-p-xylene.

*Example II.—Polymerization of α-cyano-α'-bromo-p-xylene*

0.84 gram of the compound prepared in Example I was dissolved in 20 ml. of air-free methanol and the solution was added dropwise over a 15 minute period to a stirred solution of sodium methoxide (0.22 gram/30 ml. methanol) maintained at —20° C. After 15 minutes of additional reaction at —20° C. the separated polymeric solids were isolated by filtration, washed thoroughly with hot water and hot ethanol and dried. There was obtained 0.32 gram (60%) of a slightly yellow polymeric powder which showed a reduced viscosity of 0.45 (at 40° at a concentration of 0.2 gram/deciliter in a 2/1 p-chlorophenol/phenol mixture) and showed crystallinity when examined by X-ray diffraction. The infrared spectrum of a brown brittle film pressed from this polymer under 15,000 p.s.i. at 310° C. was identical with that produced by the polymer having the general formula

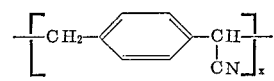

*Example III.—Preparation of poly(alpha-cyano-alpha'-methyl-p-xylylene)*

The novel precursor compound alpha'-methyl-alpha'-hydroxy-alpha-cyano-p-xylene was prepared by the reduction of p-cyanomethyl acetophenone with sodium borohydride and was found to have a melting point of 35°–37° C. and a boiling point of 135° C. at 5 mm. Hg and a refractive index ($n_d$ 25.5° C.) of 1.5362. 20 grams of the hydroxy-derivative so formed was added to 17 grams of thionyl chloride and four drops of pyridine. The resulting mixture was refluxed in 40 ml. of benzene for 6 hours. The benzene and excess reagent were removed by vacuum distillation, and an ether solution of the residue was washed with water and bicarbonate solution, dried and fractionally distilled to yield 10 grams of the novel composition, alpha'-methyl-alpha'-chloro-alpha-cyano-p-xylene, boiling point 107–111° (0.7 mm.) $n_d^{26}$ 1.5350. Infrared spectra and analytical data indicated some contamination with p-cyanomethyl styrene. Percent Cl found, 17.8. Calc'd for $C_{10}H_{10}NCl$, 19.8.

10 grams of the above-mentioned chloride was added with stirring at room temperature to a solution of 3.7 grams of potassium hydroxide in 50 ml. of methanol. There was an immediate formation of a precipitate which was washed thoroughly in a blendor with methanol, water, and acetone to yield 4.3 grams (53%) of the novel composition, poly(alpha-cyano-alpha'-methyl-p-xylylene), amorphous by X-ray diffraction, having a reduced viscosity of 4.55 (58.2°, 0.2 gram/100 ml., p-chlorophenol).

A 5-mil thick film compression molded at 270° C. showed a glass transition temperature of 195° C. 1% secant modulus at 25° of 363,000 p.s.i., tensile strength at 25° of 6,450 p.s.i. and a 2.5% elongation at break.

*Example IV.—Poly(α-cyano-α'-methyl-p-xylylene)*

1.0 gram of α-cyano-α'-chloro-α'-methyl-p-xylene was dissolved in 5 ml. methanol and 2 ml. of 12 N ammonium hydroxide was added to the solution. A polymeric precipitate formed which was shown by infrared analysis to be essentially poly(α-cyano-α' - methyl - p-xylylene).

*Example V.—Preparation of (alpha-cyano-alpha-ethyl-alpha'-methyl-p-xylylene)* p-(1-cyanopropyl)-acetophenone, boiling point 120–135° (0.6 mm.) ($n_d^{25}$ 1.5330) was formed by condensing ethyl bromide and the sodium salt of p-cyanomethyl acetophenone in refluxing ether. The product so formed was reduced with sodium borohydride to form the novel composition, alpha - cyano - alpha - ethyl - alpha' - hydroxy alpha'-methyl-p-xylylene, boiling point 110–112° C. (0.3 mm. Hg), $n_d^{25}$ 1.5220. Calc'd for $C_{12}H_{15}NO$: C, 76.15; H, 7.99; N, 7.40. Found: C, 76.34; H, 8.10; N, 7.47.

20 grams of the novel hydroxy-derivative was reacted with thionyl chloride as in the previous example to form alpha-cyano-alpha - ethyl - alpha'-chloro-alpha'-methyl-p-xylylene having a boiling point of 108°–110° C. (at 0.5 mm. Hg) which also appears to be a novel composition, and thereafter polymerizing the product at room temperature by addition to a stirred methanolic solution of potassium hydroxide. The washer polymer, poly(alpha-cyano-alpha-ethyl-alpha'-methyl-p-xylylene), 5.0 grams from 20.0 grams of the α-hydroxy composition, had a reduced viscosity of 3.0 (25° C., 0.2 gram/100 ml., dimethylformamide). Calc'd for $C_{10}H_{13}N$: C, 84.17; H, 7.65; N, 8.28. Found: C, 84.20; H, 7.71; N, 8.09 (by difference).

The polymeric material was swollen by acetone and dissolved completely in dimethyl formamide and chloroform. A film cast from chloroform showed a glass transition temperature of 230° C., 1% secant modulus of 322,000 p.s.i. at 25° C., tensile strength of 4,500 p.s.i. at 25° C., and an elongation at break of 4–5%.

*Example VI.—Preparation of poly(alpha-cyano-alpha-phenyl-alpha'-methyl-p-xylylene)*

Alpha - (p-acetylphenyl) - phenylacetonitrile, melting point 94–95° C., was reduced by sodium borohydride in methanol to yield, after workup similar to Example V and distillation, the novel product, alpha-cyano-alpha-phenyl-alpha' - hydroxy - alpha' - methyl-p-xylylene, boiling point 165°–175° (0.3 mm.) $n_d^{25}$ 1.5788. Calc'd for $C_{16}H_{15}NO$: C, 80.98; H, 6.37; N, 5.90. Found: C, 80.93; H, 6.46; N, 6.07.

Three grams of this alcohol was converted to the corresponding novel chloride alpha-cyano-alpha-phenyl-alpha'-chloro-alpha'-methyl-p-xylylene, by stirring with 2 grams of thionyl chloride in 10 ml. of anhydrous ether at room temperature and then removing the volatiles in vacuo. The novel chloride had a boiling point of 140°–145° C. at 0.05 mm. Hg. The residue was poured into a stirred solution of 5 grams of potassium hydroxide in 40 ml. of methanol at room temperature. The washed and dried product, poly(alpha-cyano-alpha-phenyl-alpha'-methyl-p-xylylene) was amorphous by X-ray, soluble in benzene and chloroform, partly soluble in acetone, softened at 200°, and had a reduced viscosity of 0.11 (25°, 0.2 gram/100 ml. of chloroform). Calc'd for $C_{16}H_{13}N$: C, 87.64; H, 5.97; N, 6.40. The acetone insoluble portion had a reduced viscosity of 0.60 (25°, 0.2 gram/100 ml. benzene).

The following examples illustrate in situ polymerization via 1,6-dehydrohalogenation of p-bis(halomethyl)-aromatic compounds.

*Example VII.—Preparation of poly(alpha-cyano-p-xylylene)*

3.00 grams of alpha, alpha'-dibromo-p-xylene, 5.00 grams of potassium cyanide, 0.20 gram of azo-bis-isobutyronitrile, 30 ml. of cyclohexanol, and 6.0 ml. air-free water were charged into a nitrogen-flushed flask equipped with an efficient high-speed mixing stirrer, reflux condenser, and thermometer. Under vigorous stirring and continuous nitrogen blanketing, the heterogeneous system was heated within 3 minutes to 80° C., external heating being no longer required above 70° C. due to the moderately exothermic nature of the reaction.

Solids began to separate during the first minute after reaching 75°; their volume was no longer increasing visibly after about 5 minutes. After 12 minutes at 80°, the system was cooled slightly and discharged into 500 ml. of hot methanol. The flocculent precipitate was separated by filtration, washed exhaustively with hot water and hot ethanol and dried. There was obtained 1.16 grams (79% yield) of a white powder which had a reduced viscosity of 2.2 (measured at 50° C. at a concentration of .2 gram/deciliter in a 2/1 molar p-chlorophenol/phenol mixture, in which is was soluble at room temperature). Percent N found, 10.7. Calc'd for $C_9H_7N$, 10.8%.

*Example VIII.—Preparation of poly(α-cyano-p-xylylene)*

A. Without a free radical producing agent: 3.00 grams of alpha,alpha'-dibromo-p-xylene, 4.00 grams of potassium cyanide, 30 ml. air free n-butanol, and 8.0 ml. air free water were mixed under $N_2$ blanketing, in a rapidly stirred flask, as in the preceding example, and reacted at 90° C. for fifteen minutes. No exotherm was observed. Digestion of the product in methanol, followed by filtration, washing, and drying yielded 0.12 gram (8% yield) of a white powder insoluble in phenols.

B. With azo-bis-isobutyronitrile as a free radical producing agent: Reaction A was duplicated, with the addition at the start of 0.20 gram of azo-bis-isobutyronitrile. An exotherm was observed above 75° C. when the reaction was brought rapidly to the 90° C. reaction temperature. The copious formation of solids which began at once, appeared to stop after the first five minutes of the 15 minute reaction period. Digestion of the product in methanol, followed by filtration, washing, and drying yielded 0.96 gram (66%) of white polymer having a reduced viscosity of 3.8 (at 50° C., concentration of 0.200 gram/deciliter in 2/1 chlorophenol/phenol mixture).

C. With the inclusion of air: Reaction B was duplicated, except that both the butanol and the water were saturated with air before preparing the reaction mixture, and there was no nitrogen cover provided during the 15 minutes of reaction at 90° C. An exotherm was observed. Workup as above yielded 0.82 gram (50%) of white polymer having a reduced viscosity of 1.2 measured as in B.

*Example IX.—Preparation of poly(α-cyano-p-xylylene)*

A. Without a free-radical producing agent: 3.00 grams of alpha,alpha'-dibromo-p-xylene, 4.00 grams of potassium cyanide, 30 ml. of air-free cyclohexanone and 8 ml. air-free water were reacted, under nitrogen blanketing and with high speed stirring as in Example VII, for 15 minutes at 90° C. There was produced 0.10 gram (7%) of a white powder insoluble in phenols.

B. With benzoyl peroxide as a free radical producing agent: Reaction A was duplicated exactly with the addition, at the start, of 0.10 grams of benzoyl peroxide. Workup of the system in the same manner as in the preceding examples after 15 minutes of reaction at 90° C. afforded 0.30 gram (21%) of white, phenol-soluble polymer having a reduced viscosity of 3.0, measured as noted in the preceding examples.

The following example illustrates the effects of solvent on yield.

*Example X.—Preparation of poly(α-cyano-p-xylylene)*

In each of the following reactions, the following charge

| | | |
|---|---|---|
| p-Xylylene dibromide | grams | 3.00 |
| KCN | do | 5.00 |
| Azo-bis-isobutyronitrile | do | 0.20 |
| Air-free $H_2O$ | ml | 8.0 |
| Air-free solvent | ml | 30.0 | was held for 10 minutes at 79–81° C. under $N_2$ blanketing with high-speed stirring.

| Solvent: | Percent Yield |
|---|---|
| Cyclohexanol | 78 |
| n-Butanol | 75 |
| i-Propanol | 66 |
| t-Butanol | 65 |
| Propionitrile | 58 |
| Cyclohexanone | 48 |
| n-Hexanol | 46 |
| Ethanol | 44 |
| Ethylene glycol dimethyl ether | 43 |
| Ethylene glycol | 19 |

*Example XI.—Preparation of poly(α-cyano-p-xylylene)*

3.50 grams of alpha, alpha'-dichloro-p-xylene, 3.00 grams of sodium cyanide, 0.20 gram azo-bis-isobutyronitrile, 40 ml. air-free butanol, and 5 ml. air-free water were charged to a 100 ml. flask blanketed with nitrogen and, while being vigorously agitated, the heterogeneous mixture was heated within three minutes to 90° C. and maintained at 88°–90° C. for 15 minutes. White solids were formed which, after filtration, repeated washing with hot methanol and water, and drying, comprises 0.72 gram (28% of theory) of white powdery polymer whose infrared spectrum (in KBr disc) was identical with that of the products in Examples VII–X and which showed a reduced viscosity of 0.30 (measured in a phenol/chlorophenol mixture at 50° C. at a 0.2 gram/deciliter concentration).

*Example XII.—A. Preparation of 1,4-bis(chloromethyl)-2-methyl-5-ethyl benzene*

55 grams of p-ethyl toluene, 140 ml. of 35% aqueous formaldehyde, and 330 ml. of concentrated hydrochloric acid were stirred together and heated to 70° C., while a stream of hydrogen chloride gas was bubbled through. After eight hours, an additional 50 ml. of 35% formaldehyde solution was added and heating and stirring were continued for eight additional hours. The organic upper layer was removed, diluted with 250 ml. benzene, washed free of acidity with water, and dried over $Na_2SO_4$. Benzene, p-ethyltoluene, and mono-chloromethylation product were removed by fractional distillation to a maximum distillate temperature of 160° C. at 40 mm. Hg pressure. The residue, 34 grams, crystallized on cooling and was recrystallized twice from methanol to 21.4 grams (22% of theory) of 1,4-bis(chloromethyl)-2-methyl-5-ethyl benzene as white platelets melting at 64°–64.5° C. Percent Cl found, 32.3. Calc'd for $C_{11}H_{14}Cl_2$, 32.7.

*B. Preparation of poly[α-cyano-2-(5)-methyl-5-(2)-ethyl-p-xylylene]*

5.00 grams of the novel precursor prepared in A, 3.00 grams of potassium cyanide, 0.10 gram azo-bis-isobutyronitrile, 40 ml. air-free n-butanol, and 8 ml. air-free water were charged into a flask equipped with a high-speed stirrer, thermometer, and reflux condenser and maintained under an atmosphere of nitrogen. Upon rapid heating, an exothermic reaction began at 75° C. with the immediate appearance of white solids. The system was held at 83°–84° C. for eight minutes and was then discharged into 700 ml. of methanol. Filtration, washing with water and hot alcohols, and drying yielded 1.70 grams (43% of theory) of a white powdery polymer having the general structure:

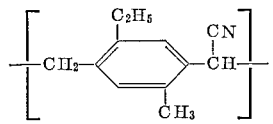

and having a reduced viscosity of 0.30 (at 50° at .200 gram/deciliter concentration in 2/1 p-chlorophenol/phenol mixture). Percent N found, 8.4. Calc'd for $C_{12}H_{13}N$, 8.2. This material dissolved in boiling dimethylformamide as well as in various phenols and it could be pressed to a transparent film at 240° C. and 10,000 p.s.i.

The following example typifies the in situ preparation of polymers of the poly(α-cyano-p-xylylene) family by conversion of a p-bis(chloromethyl)aromatic compound to the corresponding iodo-derivative immediately prior to its polymerization by 1,6-dehydrohalogenation.

*Example XIII*

4.00 grams of 1,4-bis(chloromethyl)naphthalene (containing 20% 1,5-bis(chloromethyl)naphthalene in the available sample), 4.00 grams potassium cyanide, 4.00 grams sodium iodide, 40 ml. air-free n-butanol, and 10 ml. air-free water were reacted as in Example XII under nitrogen for 10 minutes at 90° C. Digestion of the product in methanol, washing and drying yielded 0.79 gram (25% of theory) of white powdery polymer, poly-(α-cyano - 1,4-(1,5-)naphthalene - dimethylene), having the general structure

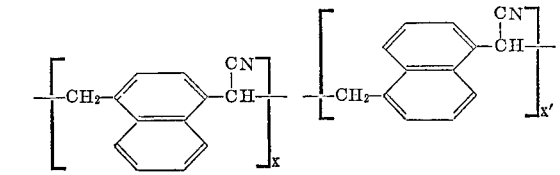

This random copolymer was found to have a reduced viscosity of 0.54 (measured as in Example XII). This material was soluble only in phenols and softened at 250°–260° C., observed in a hot-stage melting point apparatus. Percent N found, 7.6. Calc'd for $C_{13}H_9N$, 7.4.

The copolymerization of two bis(halomethyl) aromatic compounds by treatment with KCN is demonstrated by the following example.

*Example XIV*

8.5 grams of 4,4''-bis(bromomethyl)biphenyl, 13.2 grams alpha, alpha'-dibromo-p-xylene, 25.0 grams potassium cyanide, 0.10 gram azo-bis-isobutyronitrile, 120 ml. air-free cyclohexanone, and 45 ml. air-free water were charged into a nitrogen-flushed flask equipped with a high speed stirrer, reflux condenser, and thermometer, under vigorous stirring and continuous nitrogen blanketing, the heterogeneous system was heated to 75° C. at which point there was a noticeable increase of the system's viscosity and an exothermic reaction set in. The temperature was maintained at 80–81° C. by external cooling for 10 minutes, and heated to 80° C. for five additional minutes. Addition of the resulting syrup to excess methanol precipitated a polymeric mass which was washed with hot water and alcohols and dried to yield 4.5 grams of a pale green fibrous product which had a reduced viscosity of 1.6 (at 25° at a concentration of .200 gram/100 ml. in chloroform). This copolymer having the general structure:

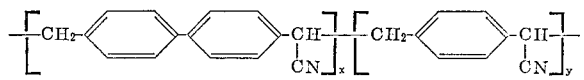

dissolved in a variety of solvents at room temperature, including dimethylformamide, dioxane, methylene chloride and methyl ethyl ketone. Polymerization of either of the starting dibromides, alone, by an identical treatment with KCN yielded products soluble only in phenols, which softened above 300° C. The copolymerized product softened at 225°–230° C. A film cast from methylene chloride showed a tensile modulus of 250,000 p.s.i. at 25° C., a tensile strength of 5,600 p.s.i. at 25° C. and an elongation at break of 7.5%. This material exhibited high flexural strength.

Example XV.—1,6-dehydrohalogenation by interfacial polymerization

Into a nitrogen-swept flask were placed a solution comprised of 2.10 grams of α-cyano-α'-bromo-p-xylene in 15 ml. of benzene and 15 ml. of an aqueous 5% solution of sodium hydroxide. The two completely immiscible phases were emulsified by high-speed stirring at room temperature. White solids began to appear within one minute and became voluminous by ten minutes during which interval the temperature had risen 8°, to 36° C. After 15 minutes the entire system was discharged into 600 ml. of warm 95% ethanol. The flocculent solids were separated by filtration, washed repeatedly with hot water and alcohol, and vacuum-dried to give 1.01 grams of white powdery polymer corresponding to a 78% yield. The infrared spectrum was identical to that of the polymer produced in Example II. Percent N calculated for $C_9H_8N$, 10.8. Percent N found, 10.5. Reduced viscosity at 50° C. in 2/1 chlorophenol/phenol mixture at 0.2 gram/deciliter concentation=13.0.

Example XVI.—Interfacial polymerization of α-cyano-α'-chloro-α'-methyl-p-xylene To a solution of 4 grams sodium hydroxide in 100 ml. of water was added with rapid stirring in a blendor a solution of 5.6 grams of α-cyano-α'-chloro-α'-methyl-p-xylene in 50 ml. of methylene chloride. After 5 minutes the methylene chloride was removed by heating on a steam bath and the polymer recovered by filtration. After washing with water, methanol, acetone, and finally petroleum ether, 3.0 grams of polymer (reduced viscosity 1.09) was obtained which was poly-[α-cyano-α'-methyl-p-xylylene].

Example XVII.—Preparation of poly(alpha-carbo-methoxy-alpha'-methyl-p-xylylene)

To a stirred solution of 400 grams of methyl phenylacetate, 240 grams acetyl chloride, and 1,000 ml. of carbon disulfide, was added 450 grams of anhydrous aluminum chloride at 0–10° C. The resulting mixture was refluxed for 16 hours then poured into a beaker containing ice and hydrochloric acid. Extraction of the reaction mixture with ether and washing the ether extracts with water followed by drying over magnesium sulfate and subjecting the extracts to distillation was found to yield 86 grams of methyl p-acetylphenylacetate as a mixture of its isomers (mainly the meta) having the structure:

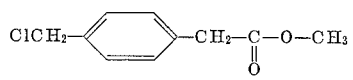

This product was reduced with 10 grams of sodium tetrahydridoborate in 400 ml. of methanol to yield 43 grams of the resulting alcohol. The alcohol was dissolved in 90 ml. of benzene and 0.3 ml. of pyridine and then 35 grams of thionyl chloride was added with cooling. After refluxing for two hours, the reaction mixture was concentrated in vacuo (0.5 mm. Hg) washed and distilled (boiling point 90–107° C.).

4 grams of the resulting chloride was added at room temperature to a methanolic solution of potassium hydroxide (3 grams/50 ml.). Almost instantaneously, a low yield of polymer having the general structure:

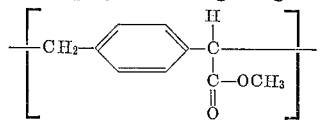

was formed. Said polymer was found to be insoluble in methanol and acetone. The product was purified by washing in a blender with methanol, water, and finally acetone. The polymer was soluble in chloroform and had a reduced viscosity of about 15–20 measured on solution containing 0.2 grams polymer per 100 ml. of chloroform solution at 25° C. Films cast from about a 3% solution of the polymer in chloroform had the following properties: glass transition temperature 150° C. 1% secant modulus 280,000 p.s.i., tensile strength at 25° C. 5,000 p.s.i. elongation at break 3–5%. The polymer was amorphous.

Isomers of the initially former methyl-p-acetyl-phenyl-acetate, which in the instant case was mainly the meta isomer, were carried through and took part in all steps of the reaction sequence *except* the polymerization. Therefore, the isomeric products remained as low molecular weight (monomeric) impurities which would be removed during the recovery steps.

Example XVII.—Preparation of poly(alpha-carbomethoxy-p-xylylene)

chloromethylation of methyl phenylacetate at 5° C. with chloromethyl methyl ether and catalytic amounts of stannic chloride resulted in a 30% yield of methyl-p-chloro-methylphenylacetate having the structure:

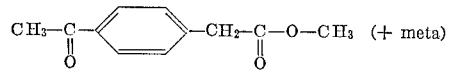

4 grams of the chloride was added to a stoichiometric amount of potassium hydroxide in 500 ml. of methanol. 1.3 grams of white polymer having the general structure:

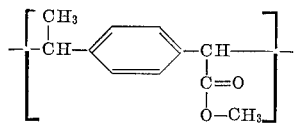

was formed and purified by washing in a blender with methanol, water and acetone. Said polymer was quite insoluble in most common solvents, but could be pressed into a tough, though hazy, film at 250° C. and 10,000 p.s.i. A sample of this film was annealed at 180° C. and was found by birefringence to have a crystalline melting point of 232° C.

Example XIX.—Preparation of poly(α-carbomethoxy-p-xylylene)

Methyl-p-chloromethylphenylacetate as prepared above was added to a methanolic lithium hydroxide solution at −5° C. A white polymer having the general structure

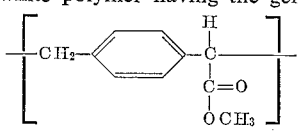

formed rapidly and was purified as specified in the previous examples. This polymer was found to be identical to the polymeric material prepared in Example XVII using potassium hydroxide.

Example XX.—Preparation of poly(α-carbomethoxy-p-xylylene)

Methyl p-chloromethylphenylacetate as prepared above was suspended in an aqueous sodium hydroxide solution at room temperature for 24 hours. During this time, the organic layer solidified to give a polymer essentially identical to that of Examples XVII and XVIII.

Example XXI 4 grams of ethyl p-chloromethylphenylacetate prepared by the chloroethylation of ethyl phenylacetate with chloromethyl methyl ether was added to a stoichiometric amount of potassium hydroxide dissolved in 20 ml. of methanol at room temperature. A white precipitate formed immediately which after thorough washing with methanol and water gave 1.3 grams of polymer shown by infrared spectrum to contain an ethyl ester and p-phenyl substitution resulting in the following general structure:

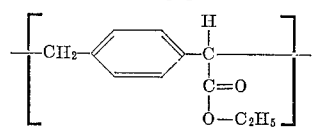

A tough though partially crosslinked film could be molded at 220° C. However, more satisfactory films (no crosslinking) were obtained by casting solutions of the polymer in chloroform. Annealing these films at 180° C. gave a birefringent melting point at 217° C. with another possible transition at about 210° C. Mechanical properties of these film samples which had a reduced viscosity of 18–20 in chloroform solution were: glass transition 90° C., 1% secant modulus at 25° C. 350,000 p.s.i., tensile strength at 25° C. 72,000 p.s.i., elongation at break 10–17%.

*Example XXII.—Poly(α-carbomethoxy-p-xylylene)*

A mixture of 1 ml. of α-carbomethoxy-α'-chloro-p-xylylene and 10 ml. of tetramethyl ammonium hydroxide (10% in water) were shaken at room temperature for one hour. The formed solid was washed with water, methanol and finally acetone to yield polymer identified by infrared spectrum as poly(α-carbomethoxy-p-xylylene).

*Example XXIII.—Preparation of alpha-carboalkoxy copolymers*

α-Carboalkoxy copolymers were prepared by adding a mixture of 80 parts of methyl p-chloromethylphenyl acetate and 20 parts of ethyl-p-chloromethylphenyl acetate, both prepared in substantially the same manner as described hereinbefore, to a solution of 1.4 grams of potassium hydroxide in 15 ml. of methanol. The precipitate was isolated and purified as in the previous examples. Infrared analysis showed the sample to contain both ethyl and methyl groups as indicated by $CH_3$ absorptions at $3.4\mu$ and $7.25\mu$. The copolymer represented generally by the structure:

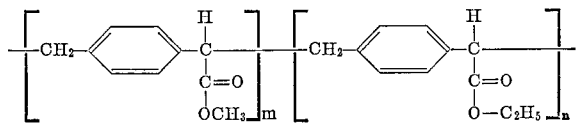

could be pressed into a tough but crosslinked film at 220° C. The copolymer was not soluble in most common solvents but was readily swollen by chloroform.

*Example XXIV.—Preparation of mixed α-substituted copolymers*

Copolymers of α-cyano-α'-methyl-p-xylene and alpha-carboethoxy-p-xylene were prepared by the addition of a mixture of 2 grams of p-(alpha-chloroethyl)phenylacetonitrile and 2 grams of ethyl p-chloromethylphenylacetate to a solution of 1.4 grams of potassium hydroxide in 15 ml. of methanol. The copolymer which was formed was washed with methanol, water, and acetone. A film could be cast at 220° C. and 10,000 p.s.i. Infrared analysis showed the copolymer to contain both carboethoxy and nitrile groups, indicating the general structure:

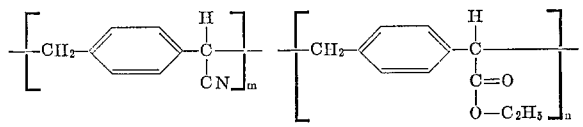

The copolymer was readily swollen by chloroform but showed no apparent solution.

The polymers and copolymers formed in the present invention are characterized by high chemical and thermal stability, and are thus suitable for the preparation of films, fibers, and molded articles for use in corrosive media and/or at elevated temperatures.

By the appropriate choice of ring- or alpha-substituents or by an appropriate copolymerization mixture, materials of varying softening point and solubility can be produced, thus allowing the fabrication by molding, casting, or spinning of useful articles possessing the fundamental chemical and thermal stability of the polymer family.

*Example XXV*

A solution of 175 grams of α,α'-dichloro-p-xylene in 600 ml. of benzene was added dropwise to a rapidly stirred and refluxing suspension of 300 grams of potassium butoxide in 700 ml. of benzene. The dropwise addition took place over a period of three hours. The resulting product was filtered and washed with benzene, ethanol, water, and again with ethanol and thereafter dried. The dry solid was mixed with 1.5 liters of ethanol in a blender and filtered. The procedure was repeated twice with water, ethanol, and benzene. The product was extracted in a Soxhlet column for eight hours with ethanol and sixteen hours with benzene. The dried product having the general formula:

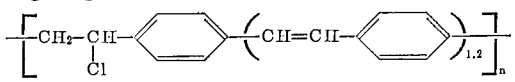

was found to contain 13.6% chlorine and exhibited a bright yellow color. The product reacted with bromine to yield a colorless product indicating partial unsaturation in the polymer chain.

*Example XXVI*

A solution of 1.0 grams of potassium in 50 ml. of t-butanol was added dropwise to a refluxing solution of 88 grams of α,α'-dichloro-p-xylene dissolved in 225 ml. of t-butanol within thirty minutes. A white product having the general formula:

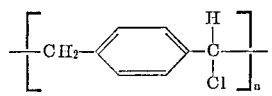

was isolated in the manner described in Example I. The product was insoluble in all common solvents and turned yellow upon heating. The sample was analyzed to contain 26.4% chlorine. While the theoretical calculated amount is 25.4% chlorine, the difference is believed to be attributed to impurities of KCl and starting materials.

The following example illustrates 1,6-dehydrohalogenation in a melt of alkali metal bases.

*Example XXVII*

A mixture of 25 grams of potassium hydroxide and 25 grams of sodium hydroxide was heated to temperatures of about 180° C. to 200° C. To the heated mixture, 20.2 grams of α,α'-dichloro-p-xylene was added within 20 minutes. After the substantial completion of the reaction, the reaction mixture was cooled and the aqueous base mixture extracted with water. The polymer was washed with water and dried giving a yield of 9.1 grams of a bright yellow solid due to partial unsaturation in the polymer chain.

*Example XXVIII*

A solution of 4.6 grams of metallic sodium in 70 ml. methanol was added dropwise into a stirred and refluxing solution of 12.1 grams of α,α,α',α',-tetrachloro-p-xylene, the resulting product of the reaction between terephthaldehyde and phosphorus pentachloride, in 100 ml. of methanol within thirty minutes. After the addition of the base, the mixture was refluxed for an additional 10 minutes. The product having the general formula

was thereafter isolated and dried as in Example XXV to give a 55% yield. The polymer was found to have a tensile modulus of 328,000 p.s.i., tensile strength of 6,500 p.s.i., and a second order transition temperature of 160° C.

*Example XXIX*

A mixture of 24.4 grams of α,α,α',α'-tetrachloro-p-xylene, 17.8 grams N-bromo-succinimide, and 100 ml.

carbon tetrachloride was refluxed for 96 hours. By distillation at 2.4 mm. Hg an oil was obtained at 140° C. to 160° C. After standing for four weeks at —10° C., crystals were isolated from a concentrated solution of this oil in methanol. After two recrystallizations, the melting point of the crystals was found to be 44° C. to 48° C. These crystals reacted rapidly with sodium methoxide in methanol to form a white insoluble polymer having the general formula

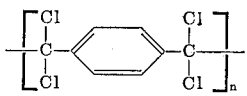

in about a 20% yield. Colorless and clear films were pressed from the polymer at 195° C.

*Example XXX*

Crystals obtained as described in Example XXIX were found to react quite rapidly with a solution of potassium hydroxide in water to form a white insoluble polymer identical to that obtained in Example XXIX.

*Example XXXI*

A solution of 125 grams of 2-chloro-p-xylene dissolved in 500 ml. of carbon tetrachloride was placed in a chlorination apparatus which was equipped with a 450 watt lamp. 558 grams of chlorine were bubbled into the solution within 9 hours to yield 279 grams of the chlorinated product having the structural formula

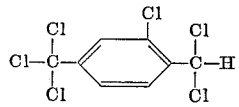

167 grams of the product was isolated by vacuum distillation at a corrected boiling point of about 310° C.

Elemental analysis showed 65.8% chlorine as compared to a theoretical percentage of 67.9% chlorine calculated for $\alpha,\alpha,\alpha',\alpha',\alpha'$-pentachloro-2-chloro-p-xylene.

A solution of 11.5 grams of sodium in methanol was added dropwise into a refluxing and stirred solution of 31.5 grams of the chlorinated 2-chloro-p-xylene dissolved in 60 ml. of methanol. A white polymer having the general formula:

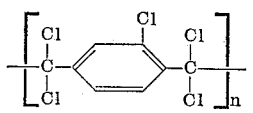

formed and was isolated by filtration in a manner similar to that of Example XXV. Clear and colorless films were cast from a tetrahydrofuran solution of the polymer. A film which was pressed at 195° C. had a tensile modulus of 600,000 p.s.i. and a second order transition temperature of 170° C.

SUMMARY OF α-HALOGENATED EXAMPLES

| Starting Material | Base | | | Polymer |
|---|---|---|---|---|
| | $(CH_3)_3COK$ [1] | $CH_3ONa$ [2] | KOH and/or NaOH [3] | |
| (A) $\alpha,\alpha'$-Dihalo-p-xylenes: | | | | |
| (i) $ClCH_2$—⟨⟩—$CH_2Cl$ | X | | Melt;[4] KOH.[5] | $+[-\underset{H}{\overset{Cl}{C}}-⟨⟩-CH_2-]+$  $+[-⟨⟩-HC=CH-]_n$ some unsaturation |
| (ii) $BrCH_2$—⟨⟩—$CH_2Br$ | X | | KOH[5] | $+[-\underset{H}{\overset{Br}{C}}-⟨⟩-CH_2-]+$ |
| (iii) $ICH_2$—⟨⟩—$CH_2I$ | X | | KOH[5] | $+[-\underset{H}{\overset{I}{C}}-⟨⟩-CH_2-]+$ |
| (B) $\alpha,\alpha,\alpha',\alpha'$-Tetrahalo-p-Xylenes: | | | | |
| (i) $Cl_2HC$—⟨⟩—$CHCl_2$ | X | X | NaOH or KOH. | $+[-\underset{Cl}{\overset{Cl}{C}}-⟨⟩-\underset{Cl}{\overset{H}{C}}-]+$ |
| (ii) $Br_2CH$—⟨⟩—$CHBr_2$ | X | X | NaOH or KOH. | $+[-\underset{Br}{\overset{Br}{C}}-⟨⟩-\underset{Br}{\overset{H}{C}}-]+$ |
| (iii) Mixture of (i) and (ii) | X | X | NaOH or KOH. | $(-\underset{Cl}{\overset{Cl}{C}}-⟨⟩-\underset{Cl}{\overset{H}{C}}-)_m(-\underset{Br}{\overset{Br}{C}}-⟨⟩-\underset{Br}{\overset{H}{C}}-)_n$ |
| (C) $Cl_2CH$—⟨⟩—$CCl_2Br$ | X | X | NaOH or KOH. | $+[-\underset{Cl}{\overset{Cl}{C}}-⟨⟩-\underset{Cl}{\overset{Cl}{C}}-]+$ |
| (D) Ring Substituted: | | | | |
| (i) $Cl_3C$—⟨(Cl)⟩—$CHCl_2$ | X | X | KOH | $+[-\underset{Cl}{\overset{Cl}{C}}-⟨(Cl)⟩-\underset{Cl}{\overset{Cl}{C}}-]+$ |

See footnotes at end of table.

SUMMARY OF α-HALOGENATED EXAMPLES—Continued

| Starting Material | Base | | | Polymer |
|---|---|---|---|---|
| | (CH₃)₃COK [1] | CH₃ONa [2] | KOH and/or NaOH [3] | |
| (ii) Cl₂CH—[C₆H₃Cl]—CHCl₂ (with Cl) | X | | KOH | —[C(Cl)(Cl)—C₆H₃Cl—C(Cl)(H)]— |
| BrH₂C—[C₆H₄]—CCl₂H | X | X | X | —[H₂C—C₆H₄—CCl₂]ₙ— |

[1] Solvents used included tert-butanol and hydrocarbons, e.g. decalin, benzene, heptane, etc.
[2] Solvent=methanol.
[3] Solvents: with the NaOH, methanol, t-butanol and mixtures thereof; with the KOH, methanol or tert-butanol; except as otherwise noted.
[4] No solvent.
[5] Solvent: tert-butanol.

*Examples XXXII–LI.—Polymerization of α,α,α',α'-tetrachloro-p-xylene in mixtures of a tertiary alcohol and a secondary or primary alcohol*

In the following examples, a charge of 4.88 grams of α,α,α',α'-tetrachloro-p-xylene (0.02 mole), 0.8 gram of sodium hydroxide (0.02 mole) and 30 ml. of a mixture of methanol and t-butanol was employed. The mixture was refluxed and stirred for one hour and precipitated in methanol. The polymer was filtered and washed with methanol and water and dried in vacuum at 40° C. Table I shows the influence on the yields of polymer, α,α,α'-trichloro-p-xylene obtained and their reduced viscosities measured in tetrahydrofuran by varying the ratios of t-butanol and methanol.

| Experiment | Percent MeOH | Percent t-BuOH | Percent Yield | R.V. |
|---|---|---|---|---|
| XXXII | 100 | 0 | 20 | 1.2 |
| XXXIII | 95 | 5 | 24 | 1.1 |
| XXXIV | 90 | 10 | 24 | 1.1 |
| XXXV | 40 | 60 | 48 | 2.4 |
| XXXVI | 20 | 80 | 48 | 3.4 |
| XXXVII | 10 | 90 | 53 | 3.2 |
| XXXVIII | 5 | 95 | 58 | 3.4 |
| XXXIX | 0 | 100 | −17 | Insoluble |

If double the amount of sodium hydroxide is used (0.04 mole), reduced viscosities and yields change.

| Experiment | Percent MeOH | Percent t-BuOH | Percent Yield | R.V. |
|---|---|---|---|---|
| XL | 100 | 0 | 40 | 1.0 |
| XLI | 50 | 50 | 73 | 1.1 |
| XLII | 10 | 90 | 83 | 0.8 |
| XLIII | 0 | 100 | 12 | Insoluble |

As the elemental analysis (in the following table) and the analysis of methoxyl groups show chlorine is partially substituted by methoxyl groups

| Experiment | MeOH, percent | t-BuOH, percent | C, percent | H, percent | Cl, percent | Elemental oxygen equivalent to (OCH₃) present |
|---|---|---|---|---|---|---|
| XLIV | 100 | 0 | 50.57 | 2.36 | 45.07 | 2.00 |
| XLV | 10 | 90 | 50.55 | 2.60 | 44.10 | 2.75 |
| XLVI | 5 | 95 | 49.84 | 2.44 | 47.28 | 0.74 |
| XLVII | 0 | 100 | 47.21 | 2.71 | 50.05 | 0 |

In this manner a random copolymer containing both halogen and methoxy groups attached to the α-carbon atoms is formed, with the amount of methoxy groups varying in relation to the amount of methanol used. Thus, it has been found possible, through the use of methanol as a solvent, as in the prior examples, to provide random copolymers having methoxy groups in α positions.

The polymerization of α,α,α',α'-tetrachloro-p-xylene has been accomplished in mixtures of a tertiary alcohol, in the case t-butanol, and various primary and secondary alcohols. The variation in yield at various ratios is shown in the following table

| Experiment | | Percent t-BuOH | 90 | 60 | 10 | 0 |
|---|---|---|---|---|---|---|
| XLVIII | | Methanol | 53 | 48 | 24 | 20 |
| XLIX | | Stearyl alcohol | 20 | 51 | 34 | 20 |
| L | | Isopropanol | 26 | 74 | 77 | 60 |
| LI | | Cyclohexanol | 33 | 48 | 33 | 28 |

*Example LII.—Poly(α,α-dichloro-p-xylylene)*

α,α-dichloro-p-xylene was first prepared by suspending 208 grams of phosphorous pentachloride in 300 ml. of carbon tetrachloride and slowly adding 120 grams of p-tolualdehyde thereto with stirring. After all the aldehyde was added, the solution was refluxed for 30 minutes. Thereafter, the solution was cooled and the phosphorous oxychloride which had formed was extracted by washing with water. The carbon tetrachloride was removed by distillation resulting in 165 grams of α,α-dichloro-p-xylene, which after being recrystallized in ethanol and hexane was found to have a melting point of 47.5–49.0° C.

A solution of 178 grams of N-bromo succinimide in 500 ml. of carbon tetrachloride was added to the 165 grams of α,α-dichloro-p-xylene prepared above. The mixture was refluxed until all of the N-bromosuccinimide was converted to succinimide to yield 241.3 grams of α,α-dichloro-α'-bromo-p-xylene having a melting point of 94°–96° C. at 1 atmosphere.

The polymerization of 25.4 grams of α,α-dichloro-α'-bromo-p-xylene was performed in a Soxhlet apparatus into which 5.6 grams of potassium hydroxide in 90 ml. of t-butanol was placed. The solution was refluxed and stirred for 95 minutes. 8.7 grams of a yellowish-white polymer, poly(α,α-dichloro-p-xylylene), having the general structure

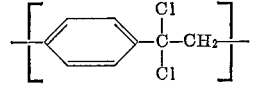

was recovered.

In the following polymerization reactions the standard isolation procedure for the polymerization was used. The procedure consists of precipitating a polymer solution into five or six times its volume of 95% ethanol. The polymer is then filtered and washed in a blender with 95% ethanol, twice again with water, and finally washed with 95% ethanol and with acetone. The polymer is air dried an then weighed.

*Example LIII.—Preparation of poly(chloro-p-xylylene)*

One gram of 2-chloro-4-chloromethyltoluene was added at room temperature to 0.4 gram of potassium dissolved in anhydrous t-butanol. After standing overnight the reaction mixture was quenched with water and the insoluable products washed with water. The residual polymer was identified as poly(2-chloro-p-xylylene), having the general structure

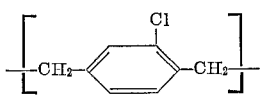

by its infrared spectrum.

*Example LIV*

11.3 grams of α-chloro-p-xylylene and 9 grams potassium-t-butoxide were heated in 250 cc. of o-dichlorobenzene. When the polymer began to precipitate out of the solution, the solution was poured in 95% ethanol and the standard isolation procedure described hereinabove was employed. The yield was 2 grams of poly-p-xylylene of the general structure:

The polymer is a white infusible powder up to 340° C. and was found to have an infrared spectrum identical with that of poly-p-xylylene. The polymer is insoluble in refluxing 1-chloronaphthalene and cannot be melt fabricated by conventional techniques.

*Examples LV–LIX*

The following examples employ the polymerization techniques discussed in Example L, except for the use of various diluents in place of o-dichloro-benzene employed above.

| Example | Diluent | Yield (grams) |
|---|---|---|
| Example LV | Decalin | 1.2 |
| Example LVI | 1-chloro-naphthalene | 2.0 |
| Example LVII | Benzene | 1.0 |
| Example LVIII | Decane | 1.5 |
| Example LIX | p-Xylene | 8.4 |

*Example LX*

18.0 grams of 1-chloro-5-chloromethyl-2-methylbenzene was admixed with 13.5 grams of potassium-butoxide in 300 cc. of o-dichlorobenzene at 160° C. for 1 hour, employing the standard isolation procedure. 8.0 grams of poly-2-chloro-p-xylylene having a reduced viscosity of 0.50 in 1-chloronaphthalene at 170° C. was isolated. The polymer analyzed for 23.6% chlorine; theoretical for poly-2-chloro-p-xylylene is 25.6%. Other diluents used in this polymer were benzene, butanol, 1-chloronaphthalene, o-dichlorobenzene, dimethyl-sulfoxide-water and the preferred diluent p-xylene.

When the reaction was run in the preferred diluent, refluxing p-xylene, a poly-2-chloro-p-xylylene, having a reduced viscosity of from 0.50 to 0.70 in 1-chloronaphthalene at 170° C. was obtained. The polymer, which has an infrared spectrum identical with that of polychloro-p-xylylene obtained by pyrolysis, softens at 270–280° C. It can be compression molded and extruded into articles possessing high chemical and thermal resistance.

*Example LXI*

12.0 grams of 1-chloro-5-chloromethyl-2-methylbenzene was heated to reflux with 9 grams of potassium-t-butoxide in 600 cc. of benzene. After ½ hour, the standard isolation procedure was applied and 2.0 grams of poly-2-chloro-p-xylylene was isolated.

*Examples LXII–LXIV*

In the following examples the same reaction procedure as employed in Example LVII was followed except that the diluents were varied.

| Example | Diluent | Yield (grams) |
|---|---|---|
| Example LXII | 300 cc. of t-butyl alcohol | 0.5 |
| Example LXIII | 1-chloro-naphthalene | 2.5 |
| Example LXIV | 600 cc. benzene | 2.0 |

*Example LXV*

16.7 grams of 1-chloromethyl-2,5-dichloro-4-methyl benzene was rapidly added to a stirred refluxing solution of 9 grams of potassium-t-butoxide in 500 ml. of p-xylylene. The reaction was run one hour. After addition was complete the standard isolation procedure was applied to give 6.5 grams of poly-2,5-dichloro-p-xylylene containing 40.5% chlorine. The polymer was found to be infusible up to 350° C. and only partially soluble in refluxing 1-chloronaphthalene.

*Example LXVI*

18 grams of 1-chloro-5-chloromethyl-2-methylbenzene was heated to 160° C. in 500 cc. of dimethylsulfoxide. 5 grams of sodium hydroxide in 50 cc. of water was added with stirring. The reaction was run 1 hour and after employing the standard isolation procedure, 0.8 grams of poly-(2-chloro-p-xylylene) was obtained.

*Example LXVII*

12.0 grams of 1-chloromethyl-3,4-dimethylbenzene was rapidly added to a stirred refluxing solution of 9 grams of potassium-t-butoxide in 500 ml. of p-xylene. The reaction was run one hour. After addition was complete and the standard isolation procedure was applied, the yield of poly-2-methyl-p-xylylene was 2.3 grams and the polymer had a reduced viscosity of 0.72 in benzene at 50° C. The polymer can be solution cast from benzene as well as compression molded. The films are transparent and flexible.

*Example LXVIII*

14.0 grams of 1-chloromethyl-2,4,6-trimethylbenzene was rapidly added to a stirred refluxing solution of 9 grams of potassium-t-butoxide in 500 ml. of p-xylene. The reaction was run one hour. After addition was complete, the standard isolation procedure was applied to give 1.5 grams of poly-2,6-dimethyl-p-xylylene having a reduced viscosity in benzene at 25° C. of 0.40, melting point of 170–180° C. It was found that the polymer can be compression molded into sheets.

*Example LXIX*

13.0 grams of 1-chloromethyl-4-methylnaphthalene was rapidly added to a stirred refluxing solution of 9 grams of potassium-t-butoxide in 500 ml. of p-xylene. The reaction was run one hour. After addition was complete the standard isolation procedure was applied to give 6.5 grams of poly(benzo-p-xylylene) having the general structure

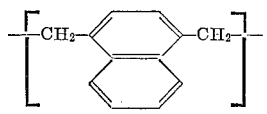

and which melted at 340° C.

Example LXX 9 grams of potassium-t-butoxide was dissolved in 500 cc. of o-dichlorobenzene at 125° C. To this mixture with stirring was added rapidly 12 grams of 1-chloromethyl-4-ethylbenzene. The reaction was stirred one hour at 125° C. then poured into 95% ethanol. No solid polymer precipitated. Upon vacuum distillation 4 grams of unreacted 1-chloromethyl-4-ethylbenzene and ½ gram of a viscous oil, poly(α-methyl-p-xylylene) were isolated. The polymer has the general structure

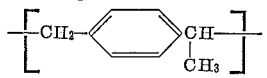

The following examples illustrate the wide range of copolymers made available by the novel polymerization processes of the present invention.

Example LXXI.—Copolymer of p-xylylene and 2-chloro-p-xylylene 5.5 grams of α-chloro-p-xylene and 7.0 grams of 1-chloro-5-chloromethyl-2-methylbenzene was rapidly added to a stirred refluxing solution of potassium-t-butoxide in 500 ml. of p-xylene to give after the standard workup procedure 4.1 grams of a copolymer of p-xylylene and 2-chloro-p-xylylene containing 15.8% chlorine and having the general structure:

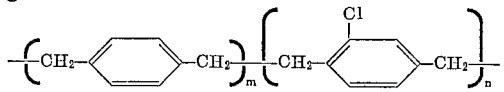

The copolymer contains 60 mole percent chloro-xylylene units based on chlorine analysis and melts at about 300° C.

Example LXXII.—Copolymer of 2-chloro and 2-methyl-p-xylylene 7.0 grams of 1-chloro-5-chloromethyl-2-methylbenzene and 6.0 grams of 1-chloromethyl-3,4-dimethylbenzene were reacted as disclosed in Example LXXI to give 4.5 grams of a copolymer of 2-chloro-2-methyl-p-xylylene. The copolymer contained 16.7% chlorine indicating the composition of the copolymer to be 65% mole chloro and 35% mole methyl. The copolymer was isolated in 43% yield and was found to have a reduced viscosity of 0.73 in 1-chloronaphthalene at 170° C. Experiments produced in the same manner as herein disclosed were run varying the copolymer composition. The following table tabulates the properties of the copolymer with the homopolymer.

2-CHLORO AND 2-METHYL-p-XYLYLENE COPOLYMERS

| Mole percent | 100% chloro | 77% chloro | 65% chloro | 38% chloro | 100% methyl |
|---|---|---|---|---|---|
| Reduced viscosity | [1] 0.61 | [1] 0.81 | [1] 0.73 | [1] 0.80 | [2] 0.72 |
| Tensile modulus, p.s.i. | 350,000 | 330,000 | 320,000 | 275,000 | 275,000 |
| Tensile strength, p.s.i. | | 7,000 | 7,000 | 5,700 | 4,600 |
| Elongation, percent | | 9 | 9 | 2–7 | 1–6 |
| Impact, ft.-lb./in.³ | | 10 | 10 | 7–22 | 8–2 |
| T. glass, °C | 70 | 65 | 60–65 | 60 | 50–55 |
| T. Softening, °C | 270 | 200 | 200 | 165 | 60 |
| Modulus, 150° C., p.s.i. | | 20,000 | 11,000 | 900 | |

[1] In 1-chloronaphthalene at 170° C. conc.=0.2 gram resin/100 ml. of solution.
[2] In benzene at 50° C. conc.=0.2 gram resin/100 ml. of solution.

Example LXXIII.—Copolymer of p-xylylene and 2-methyl-p-xylylene

A mixture of 5.6 grams of α-chloro-p-xylene (.04 mole) and 6.0 grams of 1-chloromethyl-3,4-dimethylbenzene (.04 mole) was rapidly added to a refluxing mixture of 9.0 grams of potassium-t-butoxide (.08 mole) in 500 cc. p-xylene. The reaction was refluxed 1 hour after addition. The copolymer was isolated by a standard isolation procedure and weighed 3.5 grams. The reaction was also run with 2.8 grams of α-chloro-p-xylene (.02 mole) and 9.2 grams of 1-chloromethyl-3,4-dimethylbenzene to give 3.7 grams of the copolymer. The data is tabulated in the following table.

| Mole Percent p-Xylylene to 2-methyl-p-Xylylene | Yield, Percent | Melting Point, °C | R.V. |
|---|---|---|---|
| 50/50 | 39 | 175–185 | [1] 0.30 |
| 25/75 | 40 | 150–160 | [2] 0.33 |

[1] 0.2% solution in 1-chloronaphthalene at 170° C.
[2] 0.2% solution in benzene at 50° C.

Example LXXIV.—Copolymer of 2-methyl and 2,6-dimethyl-p-xylylene 12.0 grams of 1-chloromethyl-3,4-dimethylbenzene and 14 grams of 1-chloromethyl-2,4,6-trimethylbenzene were reacted as disclosed in Example LXXI to give 4.0 grams of a copolymer of 2-methyl-2,6-dimethyl-p-xylylene. The copolymer had a reduced viscosity of 0.66 in benzene at 50° C. The procedure was repeated to give a copolymer having various percentage compositions of 2-methyl-2,6-dimethyl constituents. The properties of the copolymer and homopolymer are tabulated in the following table.

COPOLYMER OF METHYL AND DIMETHYL-p-XYLYLENE

| | Methyl | 50/50 methyl dimethyl | Dimethyl |
|---|---|---|---|
| Reduced viscosity | [1] 0.72 | [1] 0.66 | [2] 0.40 |
| Tensile strength | 275,000 | 285,000 | 260,000 |
| Tensile strength, p.s.i. | 4,600 | 4,400 | 2,200 |
| Elongation, percent | 1–6 | 2–3 | 1 |
| Impact, ft.-lb./in.³ | 8–23 | 11 | Low |
| T. glass, °C | 50–55 | 75 | 90–100 |
| T. softening, °C | 60 | 75 | 100 |

[1] In benzene at 50° C., conc.=0.2 gram resin/100 ml. of solution.
[2] In benzene at 25° C., conc.=0.2 gram resin/100 ml. of solution.

Example LXXV.—Copolymer of 2-methyl and benzo-p-xylylene 9.0 grams of 1-chloromethyl-3,4-dimethylbenzene and 4.0 grams of 1-chloromethyl-4-methylnaphthalene were reacted as disclosed in Example LXXI to give 3.0 grams of a copolymer of 2-methyl-benzo-p-xylylene. The copolymer had a reduced viscosity of 0.45 in 1-chloronaphthalene at 170° C. The reaction sequence was repeated by varying the concentration of the 2-monomer constituents. The following table compares the resulting copolymers with poly(2-methyl-p-xylylene).

COPOLYMERS OF 2-METHYL AND BENZO-p-XYLYLENE

| | 75% methyl | 90% methyl | 95% meth,1 | 100% methyl |
|---|---|---|---|---|
| Reduced viscosity | 0.45 | 0.36 | 0.52 | 0.72 |
| Tensile modulus, p.s.i. | 380,000 | 290,000 | 280,000 | 275,000 |
| Tensile strength, p.s.i. | 8,600 | 5,500 | 5,300 | 4,600 |
| Elongation, percent | 3–5 | 2–3 | 2–11 | 1–6 |
| Impact, ft.-lb./in.³ | Low | 8 | 13 | 8–23 |
| T glass, °C | 90 | 75 | 65 | 50–55 |
| T. softening, °C | 110 | 80 | 65 | 60 |

*Example LXXVI.—Copolymer of 2-chloro and 2,5-dichloro-p-xylylene*

7.0 grams of 1-chloro-5-chloromethyl-2-methyl benzene and 8.3 grams of 1-chloromethyl-2,5-dichloro-4-methyl benzene were reacted as disclosed in Example LXXI to give 5.5 grams of a copolymer of 2-chloro-2,5-dichloro-p-xylylene containing 33.7% chlorine. The copolymer was found to melt at 320–325° C.

What is claimed is:

1. Process for the preparation of linear thermoplastic α-substituted-p-xylylene polymers which comprises admixing at least one α-halo precursor having the general formula:

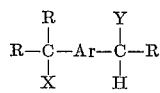

wherein the moiety designated Ar is a divalent aromatic hydrocarbon radical, R is a radical selected from the group consisting of hydrogen, halogen having an atomic number of at least about 17, phenyl, and lower alkyl groups, Y is a substituent having a sigma para value of at least about 0.0, and X is halogen, with a base, said sigma para value and the basicity of said base being commensurate such that dehydrohalogenation and simultaneous polymerization occur, and thereafter recovering the polymeric product.

2. Process for the preparation of linear thermoplastic α-substituted-p-xylylene polymers which comprises admixing at least one α-halo precursor having the general formula:

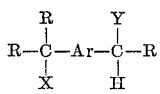

wherein the moiety designated Ar is a divalent aromatic hydrocarbon radical, R is a radical selected from the group consisting of hydrogen, halogen having an atomic number of at least about 17, phenyl and lower alkyl groups, Y is a substituent having a sigma para value from about zero to about 0.9, and X is halogen, with a base selected from the group consisting of alkali metal cyanides, alkali metal hydroxides, alkali metal alkoxides, ammonium hydroxide, and quaternary methyl ammonium hydroxide, said sigma para value and the basicity of said base being commensurate such that dehydrohalogenation and simultaneous polymerization occur, and thereafter recovering the polymeric product.

3. Process as defined in claim 2 wherein at least two species of α-halo precursors are employed, and wherein said base has a basicity commensurate with the lowest sigma para value provided by the Y substituents of the α-halo precursors employed.

4. Process as defined in claim 2 wherein an inert organic solvent is employed whose acidity is less than the acidity of the conjugate acid of the base employed to initiate dehydrohalogenation.

5. Process as defined in claim 4 wherein the normal boiling point of the inert organic solvent employed is between about 25° C. and 175° C.

6. Process as defined in claim 5 wherein the inert organic solvent is cyclohexanol.

7. Process as defined in claim 5 wherein the inert organic solvent is p-xylene.

8. Process as defined in claim 5 wherein the inert organic solvent is comprised of a mixture of alcohols.

9. Process as defined in claim 2 wherein the reaction proceeds in the substantial absence of oxygen.

10. Process as defined in claim 2 wherein a free radical producing agent is placed in admixture with the reaction mixture.

11. Process as defined in claim 10 wherein the free radical producing agent is present in amounts of from about 0.1% to 10.0% by weight of the α-halo precursor.

12. Process as defined in claim 11 wherein the free radical producing agent is azo-bis-isobutyronitrile.

13. Process for the preparation of linear thermoplastic α-substituted-p-xylylene polymers which comprises admixing at least one α-halo precursor having the general formulae:

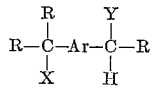

wherein the moiety designated Ar is a divalent aromatic hydrocarbon radical, R is a radical selected from the group consisting of hydrogen, halogen having an atomic number of at least about 17, phenyl, and lower alkyl groups, Y is a substituent having a sigma para value of from about zero to about +0.5, and X is halogen, with an alkali metal alkoxide to initiate, at temperatures between about −5° C. and about 200° C., dehydrohalogenation and simultaneous polymerization, and thereafter recovering the polymeric product.

14. Process as claimed in claim 13 wherein an inert organic solvent is employed whose acidity is less than the acidity of the conjugate acid of the alkali metal alkoxide and the reaction proceeds at temperatures between about room temperature and the reflux temperature of said solvent at atmospheric conditions.

15. Process for the preparation of α-substituted-p-xylylene polymers which comprises admixing at least one α-halo precursor having the general formula:

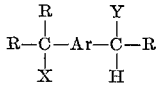

wherein the moiety designated Ar is a divalent aromatic hydrocarbon radical, R is a radical selected from the group consisting of hydrogen, halogen having an atomic number of at least about 17, phenyl, and lower alkyl groups, Y is a substituent having a sigma para value of from about +0.5 to about +0.9, and X is halogen, with a base selected from the group consisting of alkali metal cyanides, alkali metal hydroxides, alkali metal alkoxides, ammonium hydroxide, and quaternary methyl ammonium hydroxide, said sigma para value and the basicity of said base being commensurate such that a temperatures between −20° C. and about 70° C. dehydrohalogenation and simultaneous polymerization occurs, and thereafter recovering the polymer product.

16. Process as defined in claim 15 wherein an inert organic solvent is employed whose acidity is less than the acidity of the conjugate acid of the base employed and the temperature is between room temperature and the reflux temperature of said solvent at atmospheric conditions.

17. Process for the preparation of linear thermoplastic α-substituted p-xylylene polymers which comprises dissolving at least one α-halo precursor having the general formula:

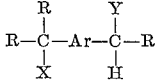

wherein the moiety designated Ar is a divalent aromatic hydrocarbon radical, R is a radical selected from the group consisting of hydrogen, halogen having an atomic number of at least about 17, phenyl, and lower alkyl groups, Y is a substituent having a sigma para value of from about zero to about +0.9, and X is halogen, in a suitable inert organic solvent for said α-halo precursor whose acidity is less than the acidity of the conjugate acid of the base employed, and bringing said organic solution into contact with an aqueous solution of base, said sigma para value and the basicity of said base being commensurate such that dehydrohalogenation and simultaneous polymerization occurs at the aqueous base/organic solution interface, and thereafter recovering the polymeric product.

18. Process for the preparation of linear thermoplastic α-substituted-p-xylylene polymers which comprises admixing at least one α-halo precursor having the general formula:

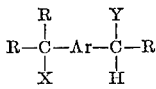

wherein the moiety designated Ar is a divalent aromatic hydrocarbon radical, R is a radical selected from the group consisting of hydrogen, halogen having an atomic number of at least about 17, phenyl, and lower alkyl groups, Y is a substituent having a sigma para value of from about zero to about +0.9, and X is halogen, with a melt of alkali metal bases, at temperatures not exceeding 200° C., said sigma para value and the basicity of the melt being commensurate such that dehydrohalogenation and simultaneous polymerization occur, and thereafter recovering the polymeric product.

19. Process for the in situ preparation of linear thermoplastic α-substituted p-xylylene polymers which comprises admixing at least one α,α'-dihalo precursor having the general structure:

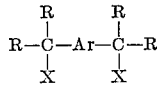

wherein the moiety designated Ar is a divalent aromatic hydrocarbon radical, R is a radical selected from the group consisting of hydrogen, halogen having an atomic number of at least about 17, phenyl, and lower alkyl groups, and X is halogen, with a soluble alkali metal cyanide to form an α-halo, α'-cyano intermediate which is simultaneously dehydrohalogenated by the remaining alkali metal cyanide present in the reaction mixture and polymerized to form an α-substituted-p-xylylene polymer and thereafter recovering the polymeric product.

20. Process as defined in claim 19 wherein both water and an inert organic solvent for the α-halo intermediate at reaction temperatures whose acidity is less than the acidity of the conjugate acid of the alkali metal cyanide, said solvent being partially water soluble, are present in the reaction mixture.

21. Process as defined in claim 19 wherein water is present in amounts sufficient to provide a nearly saturated solution of the alkali metal cyanide.

22. Process as defined in claim 19 wherein the reaction temperature is maintained for at least a portion of the total reaction period at temperatures between about 65° C. and 90° C.

23. Process as defined in claim 19 wherein an oxygen free reaction environment is maintained.

24. Process for the in situ preparation of linear thermoplastic α-substituted-p-xylylene polymers which comprises admixing at least one α,α'-dihalo precursor having the general structure:

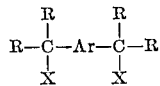

wherein the moiety designated Ar is a divalent aromatic hydrocarbon radical, R is a radical selected from the group consisting of hydrogen, halogen having an atomic number of at least about 17, phenyl, and lower alkyl groups, and X is selected from the group consisting of chlorine and bromine, with a soluble alkali metal cyanide and a soluble alkali metal iodide to form an α-iodo-α'-cyano intermediate which is simultaneously dehydrohalogenated by the remaining alkali metal cyanide present in the reaction mixture and polymerized to form an α-substituted-p-xylylene polymer and thereafter recovering the polymeric product.

25. α-hydroxy, α-methyl, α'-cyano, α'-ethyl-p-xylene.
26. α-hydroxy, α-methyl, α'-cyano, α'-phenyl-p-xylene.
27. α-chloro, α-methyl, α'-cyano-p-xylene.
28. α-chloro, α-methyl, α'-cyano, α'-ethyl-p-xylene.
29. α-chloro, α-methyl, α'-cyano-α'-phenyl-p-xylene.

30. A linear thermoplastic homopolymer having the repeating unit

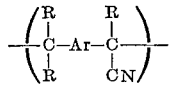

wherein the moiety designated Ar is a divalent aromatic hydrocarbon radical and R is a radical selected from the group consisting of hydrogen, halogen having an atomic number of at least about 17, phenyl, and lower alkyl groups.

31. A linear thermoplastic homopolymer having the repeating unit

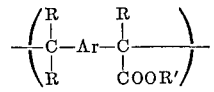

wherein the moiety designated Ar is a divalent aromatic hydrocarbon radical, R is a radical selected from the group consisting of hydrogen, halogen having an atomic number of at least about 17, phenyl, and lower alkyl groups, and R' is an alkyl.

32. Copolymer composed of the recurring units:

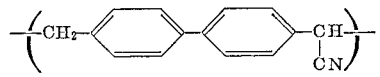

and

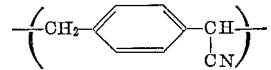

33. Copolymer composed of the recurring units:

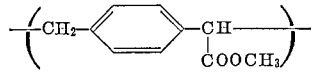

and

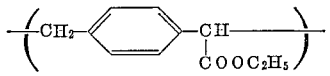

34. Copolymer composed of the recurring units:

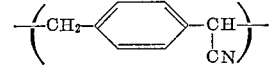

and

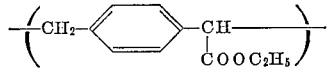

35. Copolymer composed of the recurring units:

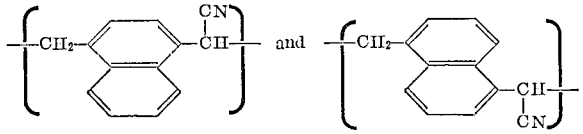

36. A linear thermoplastic polymer having the repeating unit

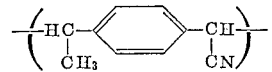

37. A linear thermoplastic polymer having the repeating unit

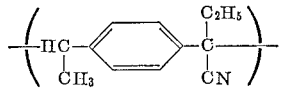

38. A linear thermoplastic polymer having the repeating unit
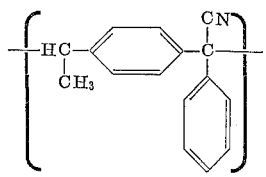
39. A linear thermoplastic polymer having the repeating unit
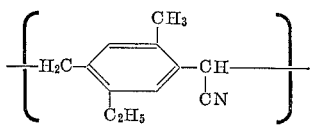
40. A linear thermoplastic polymer having the repeating unit
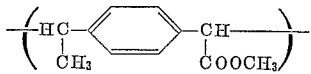
References Cited by the Examiner
UNITED STATES PATENTS
| | | | |
|---|---|---|---|
| 2,855,434 | 10/1958 | Fekete | 260—651 |
| 2,914,489 | 11/1959 | Hall | 260—2 |
| 3,054,779 | 9/1962 | Wheeler | 260—78.3 |
WILLIAM H. SHORT, *Primary Examiner.*